(12) United States Patent
Kwon et al.

(10) Patent No.: US 7,394,827 B2
(45) Date of Patent: Jul. 1, 2008

(54) ASYNCHRONOUS DATA SEGMENTATION/TRANSMISSION METHOD FOR SYNCHRONOUS ETHERNET AND DATA STRUCTURE USED THEREIN

(75) Inventors: Seo-Won Kwon, Seoul (KR); Jae-Yeon Song, Seoul (KR); Se-Youn Lim, Seoul (KR); Jong-Ho Yoon, Goyang-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 558 days.

(21) Appl. No.: 11/005,204

(22) Filed: Dec. 6, 2004

(65) Prior Publication Data

US 2005/0226274 A1 Oct. 13, 2005

(30) Foreign Application Priority Data

Apr. 8, 2004 (KR) ...................... 10-2004-0024151

(51) Int. Cl.
H04L 12/28 (2006.01)
H04J 3/16 (2006.01)
H04J 3/24 (2006.01)

(52) U.S. Cl. ........................ 370/474; 370/395; 370/470

(58) Field of Classification Search .............. 370/395.1, 370/474, 470, 528, 527, 476, 472, 473, 397, 370/395.5

See application file for complete search history.

(56) References Cited

U.S. PATENT DOCUMENTS 6,714,562 B1 * 3/2004 Calvignac et al. ........... 370/474
7,136,396 B2 * 11/2006 Francoeur et al. ........... 370/473
7,218,636 B2 * 5/2007 Paul et al. ................ 370/395.1

FOREIGN PATENT DOCUMENTS

WO WO 00/24165 4/2000

* cited by examiner

Primary Examiner—Hanh Nguyen
(74) Attorney, Agent, or Firm—Cha & Reiter, LLC (57) ABSTRACT

An asynchronous data segmentation/transmission method for synchronous Ethernet and a data structure used therein are disclosed. The asynchronous data segmentation/transmission method can segment and transmit asynchronous data such that the asynchronous data can be transmitted through a transmission frame for each transmission cycle. The method for synchronous Ethernet includes the steps of: a) comparing a size (L2) of asynchronous data to be transmitted with a size (L1) of transmission space vacant in an asynchronous frame part of a transmission frame, b) inserting the asynchronous data to be transmitted into the transmission space if the size (L2) of the asynchronous data is equal to or less than the size (L1) of the transmission space, and c), if the size (L2) of the asynchronous data is larger than the size (L1) of the transmission space, segmenting the asynchronous data to fit the size (L1) of the transmission space to insert the segmented asynchronous data thereto, and inserting remaining asynchronous data (L2-L1) into a next transmission frame. The transmission frame includes a More flag field for indicating asynchronous data segmentation/transmission.

17 Claims, 6 Drawing Sheets

ASYNCHRONOUS DATA SEGMENTATION/TRANSMISSION METHOD FOR SYNCHRONOUS ETHERNET AND DATA STRUCTURE USED THEREIN

CLAIM OF PRIORITY

This application claims priority to an application entitled "ASYNCHRONOUS DATA SEGMENTATION/TRANSMISSION METHOD FOR SYNCHRNOUS ETHERNET AND DATA STRUCTURE USED THEREIN," filed in the Korean Intellectual Property Office on Apr. 8, 2004 and assigned Ser. No. 2004-24151, the contents of which are hereby incorporated by reference.

BACKGROUND OF THE INVENTION

1. Field of the Invention

The present invention relates to synchronous Ethernet, and more particularly to an asynchronous data segmentation/transmission method for synchronous Ethernet and a data structure used therein.

2. Description of the Related Art

Generally, Ethernet is one of the common technologies for communicating data between a variety of terminals through a LAN (Local Area Network). However, the Ethernet technique is not suitable for transmission of moving pictures or voice data that are sensitive to transmission time delay. A technique for synchronously transmitting data such as image and voice has been actively researched and developed based on the conventional Ethernet. This technique is called synchronous Ethernet.

Figure 1:
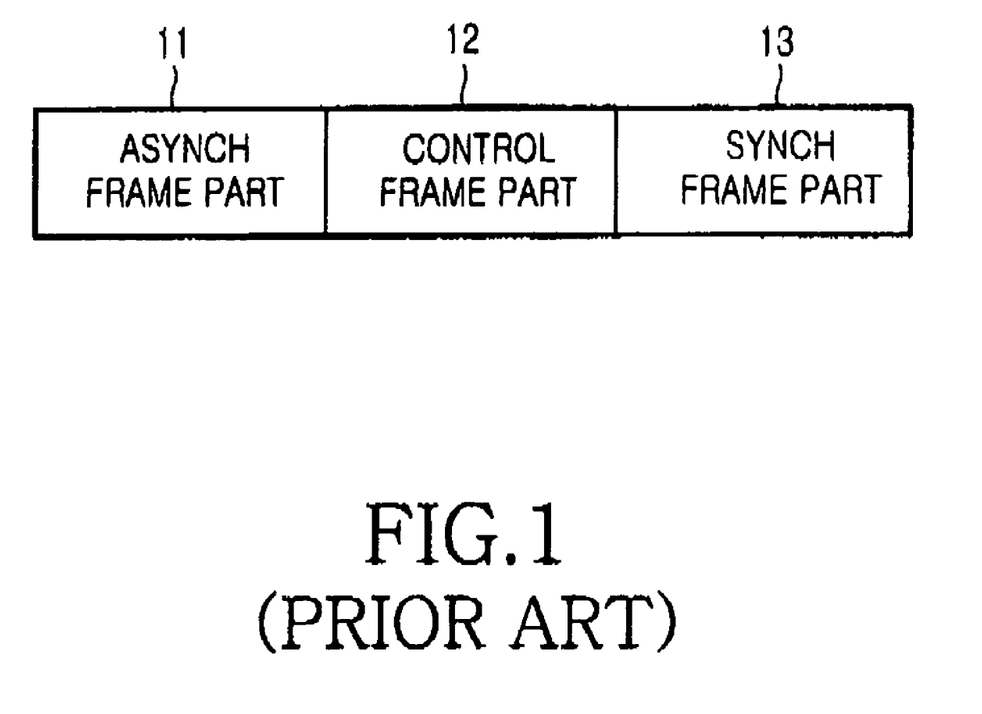
FIG. 1 is a diagram illustrating a transmission frame structure for general synchronous Ethernet.

FIG. 1 is a view illustrating a transmission frame structure for general synchronous Ethernet.

As shown in FIG. 1, the transmission frame based on one transmission cycle includes an asynchronous (hereinafter referred to as Asynch) frame part 11 for asynchronous data transmission, a control frame part 12 for control frame transmission, and a synchronous (hereinafter referred to as Sync) frame part 13 for synchronous data transmission. The transmission frame has a transmission cycle of 125 µs.

More specifically, the Synch frame part 13 for synchronous data transmission has the highest priority in the transmission cycle. According to a currently proposed standard (which my be changed in the future), the Synch frame part 13 includes a plurality of 738-byte sub-synchronous frames, basically 10.

Also, the control frame part 12 for control frame transmission includes a TSC (Time Sensitive Control) frame for time control and an MDCP (Media Device Control Protocol) frame for controlling media devices.

Further, the Asynch frame part 11 for asynchronous data transmission includes variable synchronous data based on frame units.

Figure 2:
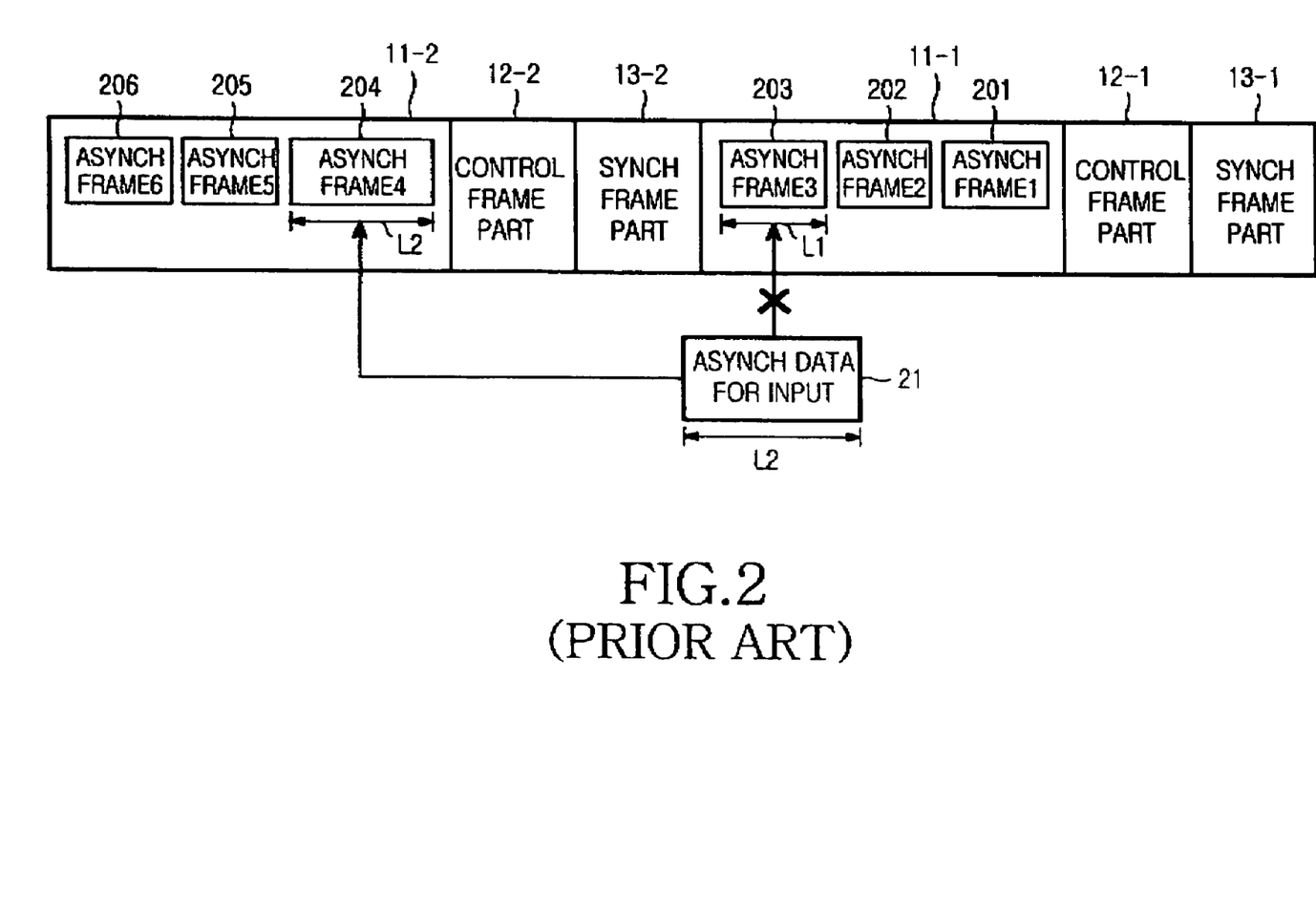
FIG. 2 is a diagram illustrating the structure of general asynchronous data.

FIG. 2 is a diagram illustrating the structure of general asynchronous data.

As shown in FIG. 2, general asynchronous data, such as Ethernet data, is composed of 7 bytes. The general asynchronous data includes a Preamble field 301 for indicating a start and end of a frame, an SFD (Start-of-Frame Delimiter) field 302, composed of 1 byte, for identifying a byte unit in a frame bit sequence and indicating a start of contents of the frame in a normal state, a Destination Address (DA) field 303, composed of 6 bytes, for indicating a destination MAC (Media Access Control) address to be transmitted to the transmission frame, a Source Address (SA) 304, composed of 6 bytes, field for indicating MAC address of a station transmitting the frame, a length/type (L/T) field 305, composed of 2 bytes, for indicating length information of data in the transmission frame and type information of protocol for the transmission frame, a data field 306 for indicating data of the frame, and a FCS (Frame Check Sequence) field 307, composed of 4 bytes, for detecting errors at respective ends of frames into which information is segmented for transmission.

Frequently, the Preamble field 301 and the SFD field 302 may be represented by a Preamble field including the SFD field 302. In that case, the Preamble field may be composed of, for example, 8 bytes.

Figure 3:
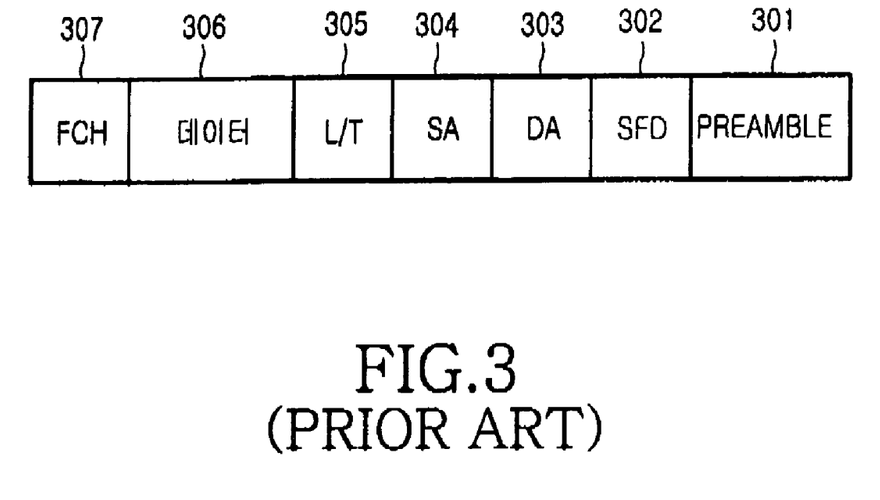
FIG. 3 is a diagram describing general asynchronous data transmission in synchronous Ethernet.

FIG. 3 is a diagram describing general asynchronous data transmission in synchronous Ethernet, in which there are two transmission frames based on two transmission cycles.

As shown in FIG. 3, a first transmission frame based on a first transmission cycle includes a Synch frame part 13-1, a control frame part 12-1 and an Asynch frame part 11-1. A second transmission frame based on a second transmission cycle includes a Synch frame part 13-2, a control frame part 12-2 and an Asynch frame part 11-2.

Since the Synch frame parts 13-1 and 13-2 and the control frame parts 12-1 and 12-2 are not related to the subject matter of the present invention, a detailed description thereon will be omitted. Instead the Asynch frame parts 11-1 and 11-2 will be described in detail as below.

The Asynch frame part 11-1 includes Asynch frames 201, 202 and 203, which are variable in length. The Asynch frame part 11-2 also includes Asynch frames 204, 205 and 206, which are variable in length. Accordingly, since the respective Asynch frames are variable in length, their sizes are also different.

In order to perform operations of the transmission frames, if the length of the last Asynch frame 203 within the first transmission cycle 11-1 is L1 and Asynch data 21 to be transmitted has a length of L2, the two lengths are compared before the Asynch data 21 is inserted into the transmission frame for the transmission cycle. If L1 is equal to or greater than L2, the Asynch data 21 to be transmitted is inserted into the Asynch frame 203 and then transmitted to a predetermined destination.

If L1 is less than L2, the Asynch data 21 to be transmitted cannot be inserted into the Asynch frame 203. Therefore, the Asynch frame 203 without data is transmitted to a predetermined destination. Instead the Asynch data 21 is inserted into the first Asynch frame 204 within the second transmission cycle 11-2 and then transmitted to a predetermined destination.

As such, in the prior art transmission method, the Synch frame part and control frame part within a transmission cycle of 125 µm are first transmitted to a predetermined destination and then the Asynch frame part is transmitted based on the comparison of the last Asynch frame length with the length of the Asynch data to be transmitted. However, if the length L2 of the Asynch data 21 is not equal to the length of the last Asynch frame, the Asynch data 21 is not transmitted during the first transmission cycle, and instead must be inserted into the next transmission frame for the next transmission cycle.

Therefore, the prior art transmission method has a disadvantage in that, since a transmission frame including an Asynch frame without Asynch data to be transmitted is transmitted based on a first transmission cycle if the sizes of the Asynch frame and the Asynch data are different from each other, it wastes bandwidth corresponding to the size of the Asynch frame during the first transmission cycle.

SUMMARY OF THE INVENTION

One aspects of the present invention relates to an asynchronous data segmentation/transmission method capable of segmenting and transmitting asynchronous data such that the asynchronous data can be most efficiently transmitted through a transmission frame for each transmission cycle, and a data structure used in the asynchronous data segmentation/transmission method.

One embodiment of the present invention is directed to an asynchronous data segmentation/transmission method for synchronous Ethernet. The method includes the steps of: a) comparing a size (L2) of asynchronous data to be transmitted with a size (L1) of transmission space vacant in an asynchronous frame part of a transmission frame; b) inserting the asynchronous data to be transmitted into the transmission space if the size (L2) of the asynchronous data is equal to or less than the size (L1) of the transmission space; and c), if the size (L2) of the asynchronous data is larger than the size (L1) of the transmission space, segmenting the asynchronous data to fit the size (L1) of the transmission space to insert the segmented asynchronous data thereinto, and inserting remaining asynchronous data (L2-L1) into a next transmission frame, wherein, the transmission frame includes a More flag field for indicating asynchronous data segmentation/transmission.

Another embodiment of the present invention is directed to a data structure used in an asynchronous data segmentation/transmission method for synchronous Ethernet. The structure includes an overhead, including a Preamble field for indicating a start and end of a frame; an SFD (Start-of-Frame Delimiter) field for identifying a byte unit in a frame bit sequence and indicating a start of contents of the frame in a normal state; a Destination Address (DA) field for indicating a destination MAC (Media Access Control) address to be transmitted to the frame; a Source Address (SA) field for indicating MAC address of a station transmitting the frame; a length/type (L/T) field for indicating length information of data in the transmission frame and type information of protocol for the frame; and a More flag field for indicating the segmentation transmission of the asynchronous data, wherein the More flag field is included in a predetermined part of a reserved area of the overhead.

BRIEF DESCRIPTION OF THE DRAWINGS

The above and other aspects, embodiments and other advantages of the present invention will be more clearly understood from the following detailed description taken in conjunction with the accompanying drawings, in which.

DETAILED DESCRIPTION

Now, embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention. Also, the terms used in the following description are terms defined taking into consideration the functions obtained in accordance with the present invention.

Figure 4:
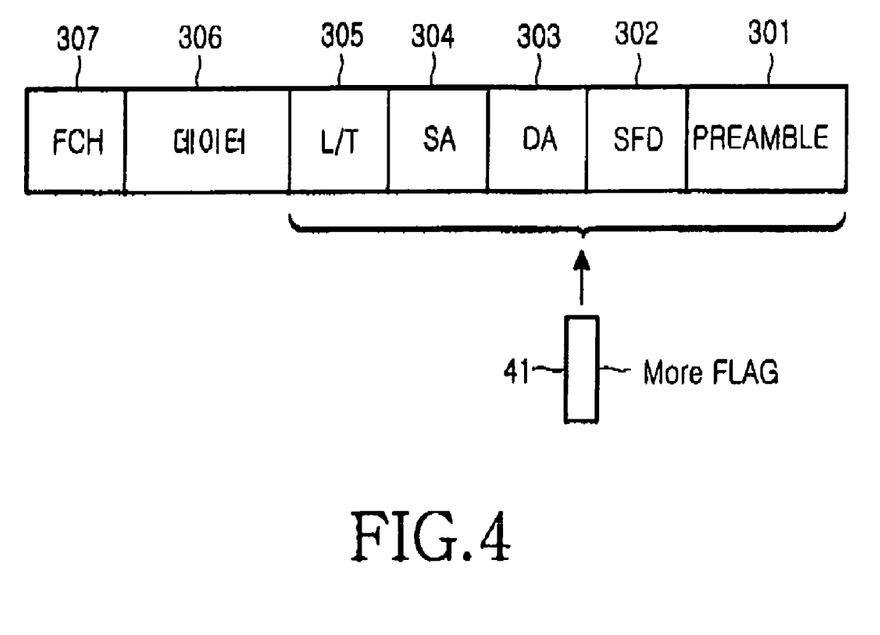
FIG. 4 is a diagram illustrating a transmission frame structure according to the present invention.

FIG. 4 is a diagram illustrating a transmission frame structure according to one embodiment of the present invention.

As shown in FIG. 4, asynchronous data (for example, Ethernet data) includes 7 bytes, and a detailed description will be followed.

The transmission frame structure includes a Preamble field 301 for indicating a start and end of the frame, an SFD (Start-of-Frame Delimiter) field 302, composed of 1 byte, for identifying a byte unit in a frame bit sequence and indicating a start of contents of the frame in a normal state, a Destination Address (DA) field 303, including 6 bytes, for indicating a destination MAC (Media Access Control) address to be transmitted to the transmission frame, a Source Address (SA) 304, including 6 bytes, field for indicating MAC address of a station transmitting the frame, a length/type (L/T) field 305, including 2 bytes, for indicating length information of data in the transmission frame and type information of protocol for the transmission frame, a data field 306 for indicating data of the frame, and an FCS (Frame Check Sequence) field 307, including 4 bytes, for detecting errors at respective ends of frames into which information is segmented for transmission. Frequently, the Preamble field 301 and the SFD field 302 may be represented by a Preamble field including the SFD field 302, therefore it is also described such that the Preamble field includes 8 bytes.

The asynchronous data further includes a new field (referred to as More flag 41) that is generated using a reserved field of the respective fields.

The More flag 41 is a type of identification field indicating whether corresponding asynchronous data is segmented such that asynchronous data is segmented and transmitted to a predetermined destination.

In one embodiment of the present invention, the More flag 41 is implemented with one bit such that it is activated with respect to the last Asynch frame to be segmented and transmitted and inactivated with respect to the remaining frame other than the Asynch frame.

However, this embodiment for the configuration of the More flag 41 is just an example, which does not limit the present invention. For example, in another embodiment, the More flag field may include two or more bits. For example, it may be implemented to include a first identification value for indicating an asynchronous frame, a second identification value for indicating an asynchronous frame in which the segmented asynchronous data are included, and a third identification value for indication an asynchronous frame in which the remaining asynchronous data are included.

Also, although FIG. 4 is an example illustrating that the More flag 41 is generated using a reserved area of the preamble 301, the More flag 41 may be generated using a reserved area included in any one of the SFD field 302, the DA field 303, the SA field 304 and the L/T field 305.

Figure 5:
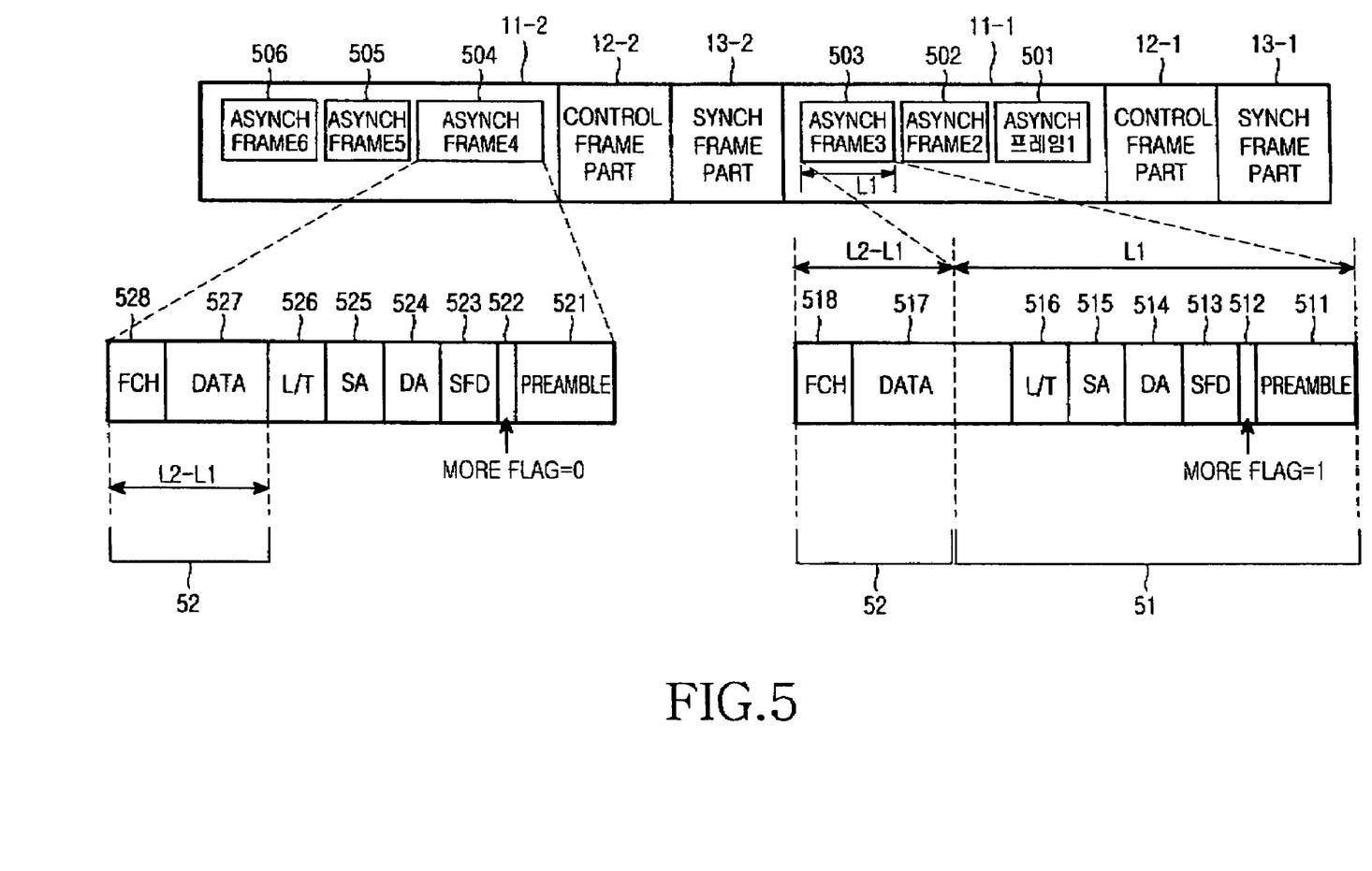
FIG. 5 is a diagram describing asynchronous data segmentation/transmission in synchronous Ethernet according to the first embodiment of the present invention.

FIG. 5 is a diagram describing asynchronous data segmentation/transmission in synchronous Ethernet according to the first embodiment of the present invention, in which there are two transmission frames based on two transmission cycles.

As shown in FIG. 5, a first transmission frame based on a first transmission cycle includes a Synch frame part 13-1, a control frame part 12-1 and an Asynch frame part 11-1; a second transmission frame based on a second transmission cycle includes a Synch frame part 13-2, a control frame part 12-2 and an Asynch frame part 11-2.

Since the Synch frame parts 13-1 and 13-2 and the control frame parts 12-1 and 12-2 are not related to the subject matter of the present invention, and a detailed description thereof will thus be omitted. Instead the Asynch frame parts 11-1 and 11-2 will be described in detail below.

The Asynch frame part 11-1 includes Asynch frames 501, 502 and 503, which are variable in length. The Asynch frame part 11-2 also includes Asynch frames 504, 505 and 506, which are variable in length. Accordingly, since the respective Asynch frames are variable in length, their sizes are also different from each other.

In order to perform operations of the transmission frames, if the length of the last Asynch frame 503 within the first transmission cycle 11-1 is L1 and Asynch data to be transmitted has a length of L2, the two lengths are compared before the Asynch data is inserted into the transmission frame for the transmission cycle. If L1 is equal to or greater than L2, the Asynch data to be transmitted is inserted to the Asynch frame 503 and then transmitted to a predetermined destination.

If L1 is less than L2, the Asynch data 21 to be transmitted cannot be inserted to the Asynch frame 503. Therefore, the Asynch frame 503 without data is transmitted to a predetermined destination. Instead the Asynch data is inserted into the first Asynch frame 504 within the second transmission cycle 11-2 and then transmitted to a predetermined destination. As shown in FIG. 4, the Asynch data is segmented to insert into the Asynch frame 503 using the More flag, thereby reducing waste of bandwidth in the transmission frame for Asynch data.

More specifically, the asynchronous data segmentation/ transmission method in synchronous Ethernet according to the first embodiment of the present invention will be described as below with reference to FIG. 5. Since the length L1 of the Asynch frame 503 is less than the length L2 of the Asynch data, the Asynch data is segmented to fit the length L1. The segmented Asynch data 51 having a length L1 generated by the segmenting is inserted to the Asynch frame 503 to transmit through the transmission frame during the first transmission cycle to a predetermined destination. The More flag 512 is set to '1' indicative of segmentation. (In the embodiment of the present invention, the More flag is basically set to '0', except for the case of a segmentation state '1.')

The remaining Asynch data 52 other than the length L1 has a length L2 and is inserted into the first Asynch frame 504 for transmission. The Asynch frame 504 further includes a preamble field 521, a More flag field 522, an SFD field 523, a DA field 524, an SA field 525 and an L/T field 526. Here, the More flag 522 is set to '0.'

As mentioned above, the More flag may be implemented with more than 2 bits such that '00' is indicative of a general Asynch frame, '01' is indicative of the last Asynch frame including segmented Asynch data, and '10' is indicative of the first Asynch frame including the remaining Asynch data of the segmented Asynch data.

Figure 6:
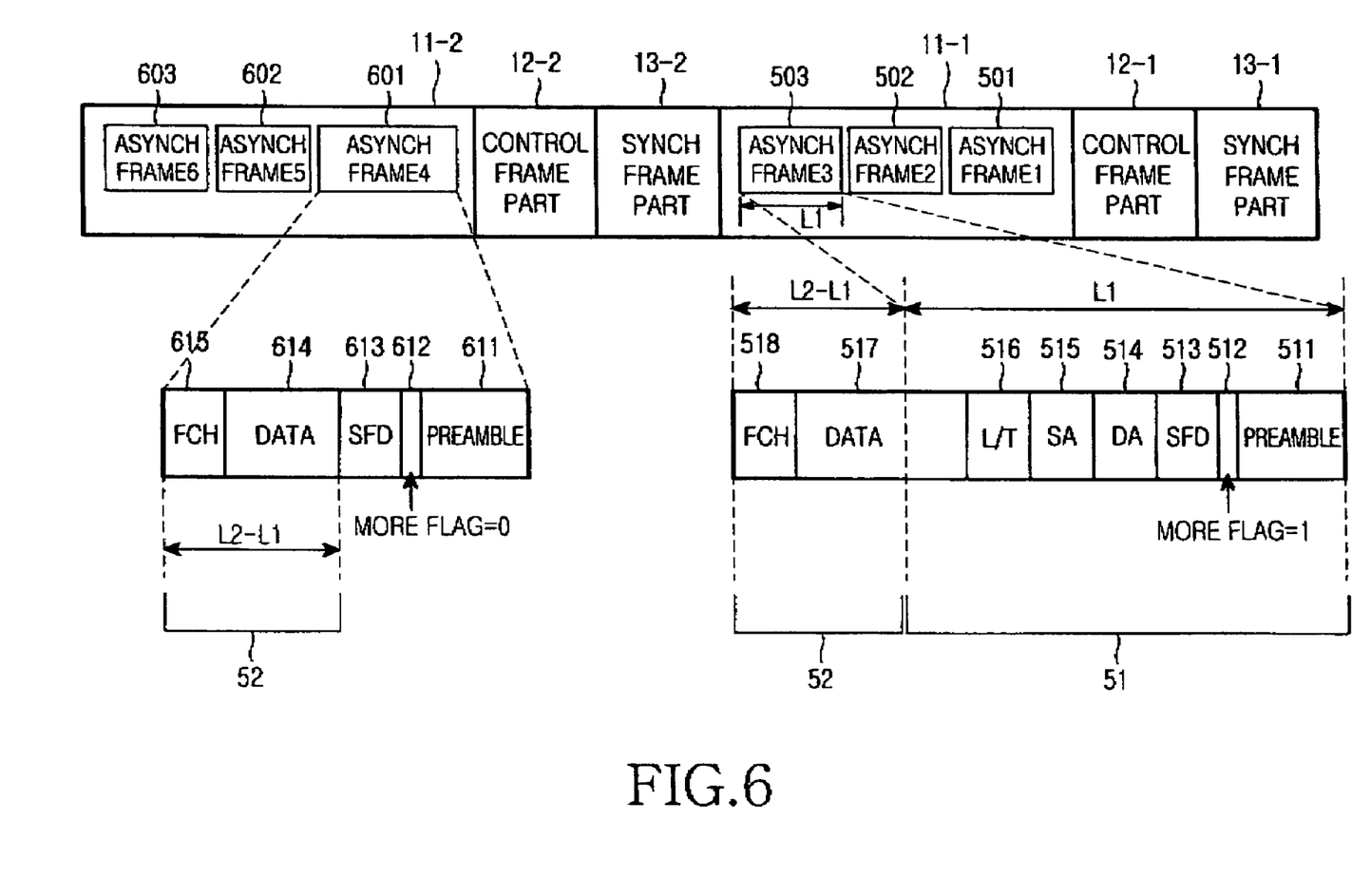
FIG. 6 is a diagram describing asynchronous data segmentation/transmission in synchronous Ethernet according to the second embodiment of the present invention.

FIG. 6 is a diagram describing asynchronous data segmentation/transmission in synchronous Ethernet according to the second embodiment of the present invention.

When the Asynch data of FIG. 6 is segmented to be transmitted, waste of the bandwidth can be reduced as in the embodiment of FIG. 5. However, like the general Asynch frame, when the remaining Asynch data 52 is inserted into the Asynch frame of the next transmission frame with a preamble field 521, a More flag frame 522, an SFD field 523, a DA field 524, an SA field 525 and an L/T field 526. Therefore, when the remaining Asynch data 52 is combined with the segmented Asynch data 51 in a receive unit, the preamble field 521, the More flag frame 522, the SFD field 523, the DA field 524, the SA field 525 and the L/T field 526, which are referred to as overhead information and transmitted to the receive unit earlier than the remaining Asynch data 52, are not required for the combining.

Therefore, the asynchronous data segmentation/transmission in synchronous Ethernet according to the second embodiment of the present invention requires at least overhead information for forming the Asynch data from the remaining and segmented Asynch data in the transmit and receive units, thereby minimizing waste of bandwidth of the transmission frame.

Referring to FIG. 6, the first transmission frame for the first transmission cycle is the same as that of FIG. 5, but the second transmission frame for the second transmission cycle includes the remaining Asynch data 52 and an overhead including a preamble field 611, a More flag field 612, and an SFD field 613.

The More flag field 612 for indicating segmentation state is processed like the earlier embodiments of the present invention.

While, the first embodiment of the present invention of FIG. 5 performs segmentation/transmission operations in the MAC (Media Access Control) layer, the second embodiment of the present invention of FIG. 6 performs such segmentation/transmission operations in corresponding physical layer.

Figure 7:
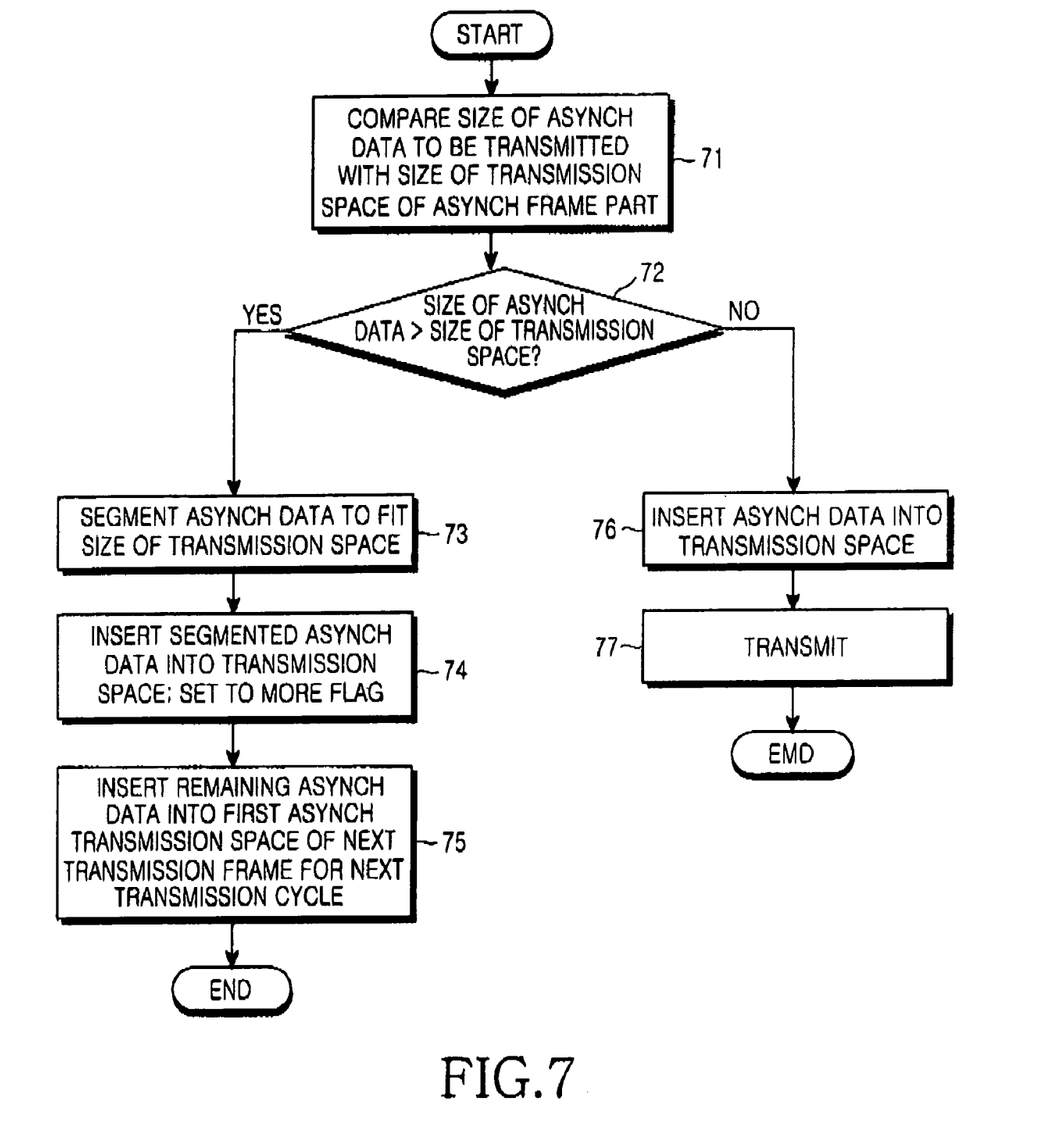
FIG. 7 is a flow chart describing an asynchronous data segmentation/transmission method in synchronous Ethernet according to the present invention.

FIG. 7 is a flow chart describing an asynchronous data segmentation/transmission method in synchronous Ethernet.

The size L2 of asynchronous data to be transmitted is compared with the size L1 of transmission space vacant in an asynchronous frame part of a transmission frame in step 71.

According to a result of the comparison, if the size L2 of the asynchronous data is equal to or less than the size L1 of the transmission space in step 72, the asynchronous data to be transmitted is inserted into the transmission space and then transmitted it to a predetermined destination in step 77.

If the size L2 of the asynchronous data is larger than the size L1 of the transmission space in step 72, the asynchronous data is segmented to fit the size L1 of the transmission space in step 73. The segmented asynchronous data is then inserted into the transmission space and a More flag is set for indicating segmentation in step 74.

The remaining asynchronous data (L2-L1) of the segmented asynchronous data is inserted into a first Asynch frame of a next transmission frame for a next transmission cycle and then transmitted it to a predetermined destination in step 75.

As apparent from the above description, the asynchronous data segmentation/transmission method can segment and transmit asynchronous data such that the asynchronous data can be transmitted through a transmission frame for each transmission cycle, thereby reducing waste of bandwidth of the transmission frame for each transmission cycle.

The asynchronous data segmentation/transmission method in synchronous Ethernet according to the first embodiment of the present invention can be implemented with an electronic computer program suitable for storing in recording media such as a CD-ROM, a RAM, a floppy disc, a hard disc, a magento-optical disc, etc.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An asynchronous data segmentation/transmission method for synchronous Ethernet, comprising the steps of:
    a) comparing a size (L2) of asynchronous data to be transmitted with a size (L1) of transmission space vacant in an asynchronous frame part of a transmission frame;
    b) inserting the asynchronous data to be transmitted into the transmission space if the size (L2) of the asynchronous data is equal to or less than the size (L1) of the transmission space; and
    c) if the size (L2) of the asynchronous data is larger than the size (L1) of the transmission space, segmenting the asynchronous data to fit the size (L1) of the transmission space to insert the segmented asynchronous data thereinto, and inserting remaining asynchronous data (L2-L1) into a next transmission frame,
    wherein, the transmission frame includes a More flag field for indicating a segmentation transmission of the asynchronous data in which the remaining asynchronous data is inserted in the next transmission frame.

2. An asynchronous data segmentation/transmission method for synchronous Ethernet, comprising the steps of:
    a) comparing a size (L2) of asynchronous data to be transmitted with a size (L1) of transmission space vacant in an asynchronous frame part of a transmission frame;
    b) inserting the asynchronous data to be transmitted into the transmission space if the size (L2) of the asynchronous data is equal to or less than the size (L1) of the transmission space; and
    c) if the size (L2) of the asynchronous data is larger than the size (L1) of the transmission space, segmenting the asynchronous data to fit the size (L1) of the transmission space to insert the segmented asynchronous data thereinto, and inserting remaining asynchronous data (L2-L1) into a next transmission frame,
    wherein, the transmission frame includes a More flag field for indicating a segmentation transmission of the asynchronous data,
    wherein the More flag field includes at least two bits, and set to have a first identification value for indicating an asynchronous frame, a second identification value for indicating an asynchronous frame in which the segmented asynchronous data are included, and a third identification value for indicating an asynchronous frame in which the remaining asynchronous data is included.

3. The asynchronous data transmission method as set forth in claim 2, wherein the More flag field includes at least one bit, and set to activation when the transmission frame has the segmented asynchronous data or to inactivation when the transmission frame does not have the segmented asynchronous data.

4. The asynchronous data transmission method as set forth in claim 2, wherein the More flag field is generated based on a Reserved area in a Preamble field of the asynchronous data.

5. The asynchronous data transmission method as set forth in claim 2, wherein the More flag field is generated based on one of Reserved areas included an overhead area of the asynchronous data.

6. An asynchronous data segmentation/transmission method for synchronous Ethernet, comprising the steps of:
    a) comparing a size (L2) of asynchronous data to be transmitted with a size (L1) of transmission space vacant in an asynchronous frame part of a transmission frame;
    b) inserting the asynchronous data to be transmitted into the transmission space if the size (L2) of the asynchronous data is equal to or less than the size (L1) of the transmission space; and
    c) if the size (L2) of the asynchronous data is larger than the size (L1) of the transmission space, segmenting the asynchronous data to fit the size (L1) of the transmission space to insert the segmented asynchronous data thereinto, and inserting remaining asynchronous data (L2-L1) into a next transmission frame,
    wherein, the transmission frame includes a More flag field for indicating a segmentation transmission of the asynchronous data,
    wherein the More flag field is generated based on a Reserved area in a Preamble field of the asynchronous data.

7. The asynchronous data transmission method as set forth in claim 6 wherein the insertion step of the c-3) step further includes:
    reconfiguring the remaining asynchronous data (L2-L1) to include an overhead.

8. The asynchronous data transmission method as set forth in claim 7, wherein the overhead includes:
    a Preamble field for indicating a start and end of the frame;
    an SFD (Start-of-Frame Delimiter) field for identifying a byte unit in a frame bit sequence and indicating a start of contents of the frame in a normal state;
    a Destination Address (DA) field for indicating a destination MAC (Media Access Control) address to be transmitted to the frame;
    a Source Address (SA) field for indicating a MAC address of a station transmitting the frame;
    a length/type (L/T) field for indicating length information of data in the frame and type information of protocol for the frame; and
    a More flag field for indicating the segmentation/transmission of the asynchronous data.

9. The asynchronous data transmission method as set forth in claim 7, wherein the overhead includes:
    a Preamble field for indicating a start and end of the frame;
    an SFD (Start-of-Frame Delimiter) field for identifying a byte unit in a frame bit sequence and indicating a start of contents of the frame in a normal state; and
    a More flag field for indicating the segmentation/transmission of the asynchronous data.

10. An asynchronous data segmentation/transmission method for synchronous Ethernet, comprising the steps of:
    a) comparing a size (L2) of asynchronous data to be transmitted with a size (L1) of transmission space vacant in an asynchronous frame part of a transmission frame;
    b) inserting the asynchronous data to be transmitted into the transmission space if the size (L2) of the asynchronous data is equal to or less than the size (L1) of the transmission space; and
    c), if the size (L2) of the asynchronous data is larger than the size (L1) of the transmission space, segmenting the asynchronous data to fit the size (L1) of the transmission space to insert the segmented asynchronous data thereinto, and inserting remaining asynchronous data (L2-L1) into a next transmission frame,
    wherein, the transmission frame includes a More flag field for indicating a segmentation transmission of the asynchronous data, wherein the More flag field includes at least one bit, and set to activation when the transmission frame has the segmented asynchronous data or to inactivation when the transmission frame doesn't have the segmented asynchronous data, wherein the More flag field is generated based on one of Reserved areas included an overhead area of the asynchronous data.

11. A process for segmenting/transmitting asynchronous data in a network transmission frame for using synchronous Ethernet protocol, comprising:

providing an overhead, including:

inserting a Preamble field for indicating a start and end of a frame;

inserting an SFD (Start-of-Frame Delimiter) field for identifying a byte unit in a frame bit sequence and indicating a start of contents of the frame in a normal state;

inserting a Destination Address (DA) field for indicating a destination MAC (Media Access Control) address to be transmitted the frame;

inserting a Source Address (SA) field for indicating MAC address of a station transmitting the frame;

inserting a length/type (L/T) field for indicating length information of data in the transmission frame and type information of protocol for the frame; and inserting segmented asynchronous data into an asynchronous frame part of the transmission frame;

inserting a More flag field for indicating the segmentation/transmission of the asynchronous data in which remaining segmented asynchronous data is to transmitted in a subsequent frame, wherein the More flag filed is included in a predetermined part of a reserved area of the overhead, and transmitting the frame over the synchronous Ethernet network.

12. The process as set forth in claim 11, wherein the More flag field includes at least one bit, and set to activation when the frame has the segmented asynchronous data or to inactivation when the frame does not have the segmented asynchronous data.

13. A process for segmenting/transmitting asynchronous data in a network transmission frame for using synchronous Ethernet protocol, comprising:

providing an overhead, including:

inserting a Preamble field for indicating a start and end of a frame;

inserting an SFD (Start-of-Frame Delimiter) field for identifying a byte unit in a frame bit sequence and indicating a start of contents of the frame in a normal state;

inserting a Destination Address (DA) field for indicating a destination MAC (Media Access Control) address to be transmitted the frame;

inserting a Source Address (SA) field for indicating MAC address of a station transmitting the frame;

inserting a length/type (L/T) field for indicating length information of data in the transmission frame and type information of protocol for the frame; and inserting segmented asynchronous data into an asynchronous frame part of the transmission frame;

inserting a More flag field for indicating the segmentation/transmission of the asynchronous data in which remaining segmented data is to be transmitted in a subsequent frame, wherein the More flag filed is included in a predetermined part of a reserved area of the overhead, and transmitting the frame over the synchronous Ethernet network, wherein the More flag field includes at least two bits, and set to have a first identification value for indicating an asynchronous frame, a second identification value for indicating an asynchronous frame in which the segmented asynchronous data are included, and a third identification value for indication an asynchronous frame in which the remaining asynchronous data are included.

14. A synchronous Ethernet apparatus comprising:

a memory including executable code;

a processor arranged to execute the code to a) comparing a size (L2) of asynchronous data to be transmitted with a size (L1) of transmission space vacant in an asynchronous frame part of a transmission frame, b) inserting the asynchronous data to be transmitted into the transmission space if the size (L2) of the asynchronous data is equal to or less than the size (L1) of the transmission space; and c), if the size (L2) of the asynchronous data is larger than the size (L1) of the transmission space, segmenting the asynchronous data to fit the size (L1) of the transmission space to insert the segmented asynchronous data there into, and inserting remaining asynchronous data (L2-L1) into a next transmission frame, wherein, the transmission frame includes a More flag field for indicating a segmentation transmission of the asynchronous data in which the remaining asynchronous data is inserted in the next transmission frame.

15. The apparatus as set forth in claim 14, further comprising activating the More flag for displaying the segmentation/transmission status.

16. The apparatus as set forth in claim 15, wherein the More flag field includes at least one bit, and set to activation when the transmission frame has the segmented asynchronous data or to inactivation when the transmission frame does not have the segmented asynchronous data.

17. A synchronous Ethernet apparatus comprising:

a memory including executable code;

a processor arranged to execute the code to a) comparing a size (L2) of asynchronous data to be transmitted with a size (L1) of transmission space vacant in an asynchronous frame part of a transmission frame, b) inserting the asynchronous data to be transmitted into the transmission space if the size (L2) of the asynchronous data is equal to or less than the size (L1) of the transmission space; and c), if the size (L2) of the asynchronous data is larger than the size (L1) of the transmission space, segmenting the asynchronous data to fit the size (L1) of the transmission space to insert the segmented asynchronous data there into, and inserting remaining asynchronous data (L2-L1) into a next transmission frame, wherein, the transmission frame includes a More flag field for indicating a segmentation transmission of the asynchronous data, wherein the More flag field includes at least two bits, and set to have a first identification value for indicating an asynchronous frame, a second identification value for indicating an asynchronous frame in which the segmented asynchronous data are included, and a third identification value for indicating an asynchronous frame in which the remaining asynchronous data is included.

* * * * *